United States Patent [19]

Willinger

[11] 4,392,570
[45] Jul. 12, 1983

[54] AQUARIUM NET ASSEMBLY AND PACKAGING THEREFORE

[75] Inventor: Allan H. Willinger, Englewood, N.J.

[73] Assignee: Willinger Bros. Inc., Englewood, N.J.

[21] Appl. No.: 312,221

[22] Filed: Oct. 19, 1981

[51] Int. Cl.³ .............................................. B65D 69/00
[52] U.S. Cl. ......................................... 206/231; 119/5
[58] Field of Search ................... 119/5, 3; 211/66, 68; 206/231, 228, 373, 374, 375

[56] References Cited

U.S. PATENT DOCUMENTS 743,399 11/1903 Seebold et al. ........................ 24/3 A
3,895,605 7/1975 Goldman ................................ 119/5

Primary Examiner—Hugh R. Chamblee
Attorney, Agent, or Firm—Abraham Friedman

[57] ABSTRACT

An aquarium net assembly comprising an aquarium net including a frame mounted netting sack and an elongated wand extending from said frame, a suspension bracket mounted on said wand for movement along the longitudinal axis of said wand for rotation about the axis said suspension bracket, comprising a sleeve frictionally engaged about said wand and an arm extending from said sleeve, said arm terminating in a downwardly extending lip in combination with a flat bag-like enclosure for said assembly within which said frame mounted net and said bracket is received, said bracket being disposed adjacent to the frame and having its arm in alignment with the plane of the frame thus constituting a flat packaged fish net assembly.

1 Claim, 3 Drawing Figures

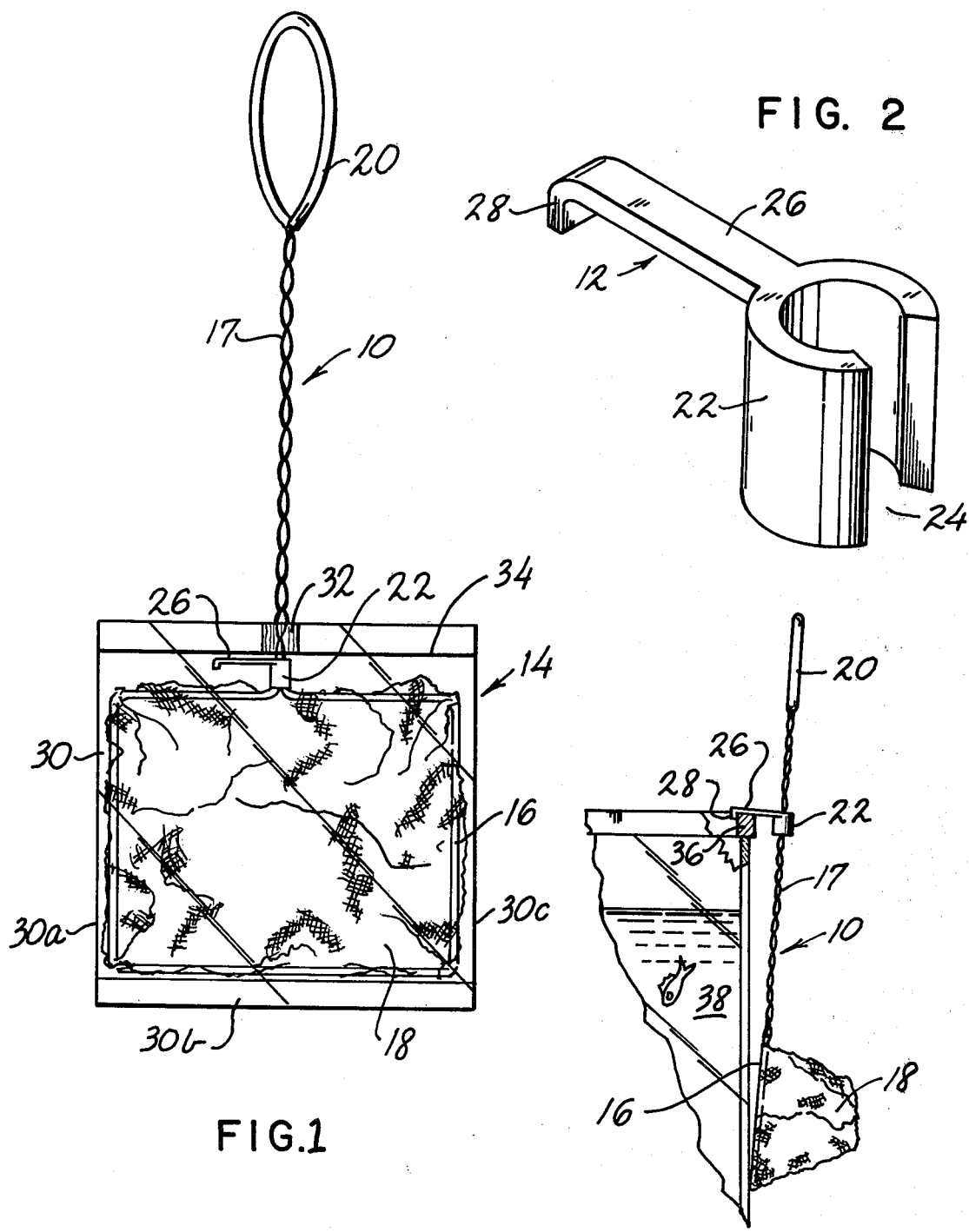

AQUARIUM NET ASSEMBLY AND PACKAGING THEREFORE

SUMMARY OF INVENTION

Accordingly it is the object of the present invention to provide a fish net assembly with means applicable to existing as well as new nets whereby it may be stored when not in use with a minimum amount of exposure to view so that the aesthetic appearance of the aquarium is not destroyed.

It is therefore an object of this invention to provide a suspension bracket for a fish net whereby it may be suspended from the rim of the aquarium tank and may be disposed behind the rear wall of the tank so as to obscure it from view.

Another object of this invention is to provide a fish net assembly wherein the suspension bracket means may be readily attached to a fish net and removed therefrom as desired.

A still further object of this invention is to provide a fish net assembly with a suspension bracket which is capable of being disposed at any desired elevation along the length of the manipulating wand thereof so that it may be readily moved to a position in which it will not interfere with the manipulation of the net or its packaging or storage.

Another object of this invention is to provide a fish net assembly wherein the possibility of loss of the suspension bracket by accident or pilferage during exposure for sale is minimized.

BACKGROUND OF INVENTION

This invention relates to a fish net assembly and packaging therefore and more particularly to a fish net assembly wherein means are provided for conveniently and efficiently storing the fish net during periods of non-use as well as packaging means therefore adapted to economically and conveniently package the assembly in a pilfer proof manner.

Fish nets are utilized in the aquarium hobby for removing and transporting fish from and to an aquarium tank, as desired. Such nets since they are immersed in water when in use, are inconvenient to carry from place to place for storage and are therefore usually stored adjacent to the aquarium tank so as to be readily available for use when desired.

Customarily the fish net is placed on top of the tank as when a tank cover is provided. In such circumstances the net is exposed to view and in many respects tends to detract from the aesthetic appearance of the aquarium. Similar problems are presented when a net is stored on shelves or the like adjacent to the aquarium stand.

Such nets are usually formed of wire and essentially constitute a wire frame provided with extended portions which are twisted together to form a manipulating wand so that it may be dipped into the aquarium tank and manipulated there to capture a fish.

The foregoing objects, advantages, features and results of the present invention, together with various other objects, advantages, features and results which will be evident to those skilled in the tropical fish aquarium art in the light of this disclosure, may be achieved with the exemplary embodiment of the invention described in detail hereinafter and illustrated in the accompanying drawings.

BRIEF DESCRIPTION OF THE DRAWINGS

FIG. 1 is a front elevational view of a packaged aquarium net assembly in accordance with the present invention.

FIG. 2 is a perspective view of the suspension bracket in accordance with the present invention, shown on enlarged scale.

FIG. 3 is a side elevational view of an aquarium net assembly removed from its packaging enclosure shown in stored position on an aquarium tank with the netting sack extended.

DETAILED DESCRIPTION OF THE PREFERRED EMBODIMENT

As is shown in FIG. 1, the invention comprises an aquarium fish net assembly designated generally by the numeral 10 which carries a suspension bracket member as more particularly shown in FIG. 2 and designated generally by the numeral 12, the assembly is adapted to be enclosed in packaging enclosure designated generally by the numeral 14 for transportation and sales display.

The fish net assembly 10 comprises a fish net which may be of conventional form and is comprised of a plastic coated wire frame 16 preferably of rectangular configuration which is provided with an integrally formed elongated twisted wire wand 17 extending therefrom. The wand 17 terminates in a hand grip 20 in the form of a loop. The wire utilized for the formation of the net is coated with a plastic or elastomeric material such as for example a polyvinyl-chloride which in addition to preventing corrosion of the steel wire, from which the frame is usually formed, provides a cushioning or somewhat compressible surface layer therefore. The looped hand grip is also desirably enclosed in an additional tube of similar plastic material to provide a more effective and convenient hand grip therefore.

An open mouth sack of formaminous material or netting 18 preferably formed of a synthetic resin fabric such as nylon or polyethelene is secured by suitable means, such as by stitching along about the perimeter of the rectangular frame 16. The meeting terminal portions of the wire along one side of the frame are twisted together to form the wand 17 which terminates in the hand grip 20.

The aquarium fish net assembly is further provided with a suspension bracket 12 for supporting the same in a suspended position as more particularly illustrated in FIG. 2. Said suspension bracket is in the form of a generally "C" shaped sleeve 22 comprised of a cylinder having an axially extending interruption or split 24 separating the wall thereof and extending from rim to rim of the sleeve as shown at 24. An arm 26 extends outwardly from the upper rim of the sleeve wall in diametric opposition to the split. The terminal end of the arm remote from the sleeve is provided with a depending lip 28. The sleeve is dimensioned so that it will encompass at least a major portion of the circumference of the twisted wire handle. It is formed of a plastic material having sufficient flexibility and resilience to permit the split to be temporarily enlarged so that the sleeve may be snapped into position about the twisted wire handle and to frictionally grip the same. The frictional engagement is sufficient to maintain the suspension bracket at any selected elevation and radial angular position. The suspension bracket is nevertheless capable of being slid along and rotated about the wand as desired by the user.

The compressibility of the wire coating facilitates the sliding movement of the suspension bracket as well as its retention in a fixed position. By the same token, the suspension bracket may be rotated about the axis of the twisted wire wand and will be retained against displacement in any desired radial position. The suspension bracket is advantageously integrally formed by injection molding of a plastic material.

It will be apparent from the foregoing that the arrangement provides an aquarium fish net assembly with a suspension bracket which may be snapped onto and removed from the net and is capable of being frictionally maintained in position on the handle of the net. The suspension bracket may be manually moved along or about the handle of the net and manually relocated to any other desired position.

The net may readily be stored when not in use by merely rotating the suspension bracket so that it occupies a position projecting outwardly from the plane of the net frame and the arm may thus rest upon the upper rim of an aquarium tank in the manner indicated in FIG. 3 to suspend the net therefrom. The suspension bracket arm may be positioned at any desired elevation along the handle of the net so that only so much of the upper portion of the handle is visible above the aquarium rim as is desired. The fish net may thus be stored unobstrusively suspended from the tank rim and avoids an unsightly appearance. The net will nevertheless be available for immediate use.

It will be noted that in use for trapping fish it is undesirable to have an element protruding from the plane of the net frame since such projection causes interference. This is particularly true when it is desired to bring the face of the net into close proximity or contact with aquarium wall to thus prevent the escape of the fish. By rotating the suspension bracket so that the arm is positioned in alignment with the plane of the net frame it may be used without interference therefrom. The snagging of the net with aquarium plants and accessories is also prevented.

In packaging and marketing an item of this type significant problems are encountered. Since the suspension bracket is separable from the wand, any exposure of the arm beyond the packaging enclosure permits removal or loss of the support arm by accident or by deliberate pilferage. Furthermore any projection of the arm from the package may cause it to be snagged with others and requires additional packaging space. To completely enclose the entire net assembly in a package would involve additional expense as well as packaging space as would be the case if the entire assembly were to be enclosed in a transparent plastic bubble on a card. The foregoing arrangement of the assembly permits the elimination of these possibilities and minimizes packaging cost and space while at the same time providing a desirable arrangement for visible display purposes at the point of sale.

In order to overcome the foregoing disadvantages, the net portion of the fish net assembly comprising the frame and netting mounted thereon as well as the suspension bracket is enclosed in transparent plastic bag 30. The wand is permitted to extend from the upper edge of the bag. The bag is formed of two layers of a transparent heat sealable plastic film suitably joined as by heat sealing along three of its sides as indicated at 30a, 30b and 30c. The bag is dimensioned so that the upper edge thereof extends above the net frame for the distance necessary to enclose the suspension bracket when located at its lowermost position as shown in FIG. 1 leaving a sufficient margin above the bracket to accommodate a heat seal. The seal is formed along the top edge of the bag as shown at 34. For this purpose the suspension bracket 12 is rotated about the wand to a position wherein it extends parallel to the plane of the frame and is in alignment therewith. The frame and bracket portion of the net is disposed within and the layers of bag material are joined to form the upper edge closure for the bag. This is advantageously accomplished by heat sealing the layers to each other as indicated at 34. It will be noted that the heat seal is interrupted at as indicated at 32, to accommodate and permit the projection of the wand through the opening thus formed.

By reason of the foregoing arrangement a relatively flat package is provided for the net assembly. The package occupies a minimum amount of package space and yet permits the item to be suitably displayed at the point of sale. The package further permits the suspension bracket to be enclosed within the bag so as to prevent accidental displacement or loss as well as to prevent the pilferage of the suspension bracket which would otherwise be readily removeable. It should also be noted that the projecting wand permits the packaged item to be hung on a display rack by means of the hand grip loop thus eliminating the requirement of a perforated stiffening attachment so as a "header" for the plastic bag as would otherwise be the case.

It will be seen from the foregoing that there has been provided an aquarium fish net assembly which may be readily and efficiently utilized and conveniently and unobstrusively stored when not in use. The arrangement further provides an economical packaging arrangement which eliminates the possibility of accidental loss or pilferage of a readily separable element of the assembly and minimizes packaging bulk.

Numerous alterations of the structure herein disclosed will suggest themselves to those skilled in the art. However, it is to be understood that the present disclosure relates to a preferred embodiment of the invention which is for purposes of illustration only and is not to be construed as a limitation of the invention.

I claim:

1. An aquarium net assembly comprising an aquarium net including a frame mounted netting sack and an elongated wand extending from said frame, a suspension bracket mounted on said wand for movement along the longitudinal axis of said wand for rotation about the axis said suspension bracket, comprising a sleeve frictionally engaged about said wand and an arm extending from said sleeve, said arm terminating in a downwardly extending lip in combination with a flat bag-like enclosure for said assembly within which said frame mounted net and said bracket is received, said bracket being disposed adjacent to the frame and having its arm in alignment with the plane of the frame thus constituting a flat packaged fish net assembly.

* * * * *